United States Patent [19]
Bigo

[11] Patent Number: 4,953,667
[45] Date of Patent: Sep. 4, 1990

[54] WHEEL BRAKING DEVICE, PARTICULARLY FOR A BABY CARRIAGE

[75] Inventor: Jean Bigo, Cholet, France

[73] Assignee: AMPAFRANCE, Boulogne-Billancourt, France

[21] Appl. No.: 357,714

[22] Filed: May 26, 1989

[30] Foreign Application Priority Data

May 26, 1988 [FR] France ................. 88 07012

[51] Int. Cl.$^5$ ................................. B60T 1/06
[52] U.S. Cl. ........................ 188/31; 188/20; 188/69; 188/74; 267/164; 280/720
[58] Field of Search ............ 188/20, 31, 69, 75, 188/76, 74, 1.12; 267/164; 280/669, 718, 720

[56] References Cited

U.S. PATENT DOCUMENTS

| | | | |
|---|---|---|---|
| 1,735,541 | 11/1929 | Miller | 188/69 X |
| 1,861,958 | 6/1932 | Gallinant | 188/20 |
| 1,879,759 | 9/1932 | Mahr . | |
| 2,480,431 | 8/1949 | Welsh | 188/20 |
| 2,864,465 | 12/1958 | Welsh et al. | 188/20 |
| 2,905,275 | 9/1959 | Kostolecki et al. | 188/74 |
| 4,027,898 | -6/1977 | Steen | 280/720 |
| 4,116,464 | 9/1978 | Haley . | |

FOREIGN PATENT DOCUMENTS

| | | |
|---|---|---|
| 0064368 | 11/1982 | European Pat. Off. . |
| 2351435 | 4/1975 | Fed. Rep. of Germany . |
| 2539691 | 7/1984 | France . |
| 8412509 | 8/1984 | France . |
| 8502374 | 2/1985 | France . |
| 823372 | 11/1959 | United Kingdom . |
| 2197042 | 5/1988 | United Kingdom . |

*Primary Examiner*—George E. A. Halvosa
*Attorney, Agent, or Firm*—Oblon, Spivak, McClelland, Maier & Neustadt

[57] ABSTRACT

The wheel braking device comprises a chassis mounted by a suspension on an axle common to a pair of wheels and a brake member operated by a brake pedal and adapted to brake the rotation of at least one wheel. The brake pedal is mounted for rotation with the axle. The suspension member is mounted near the wheel, about an eccentric fastened to the axle, and is provided with a brake member. The wheel is provided with a brake drum fastened to the wheel and adapted to cooperate by its periphery with the corresponding brake member when the axle is turned in a first direction through action on the brake pedal, thus bringing the brake member towards and into contact with the periphery of the brake drum. The same action is controlled simultaneously on the other wheel on the axle.

11 Claims, 4 Drawing Sheets

WHEEL BRAKING DEVICE PARTICULARLY FOR A BABY CARRIAGE

BACKGROUND OF THE INVENTION

1. Field of the Invention

The present invention relates to a braking device adapted to be used in particular for baby carriages and capable of braking or immobilizing a baby carriage by acting on at least one of its wheels.

2. Discussion of the Background

Braking devices are already known in which a locking member is moved axially relative to the wheel and thus inserted between two spokes or caused to act on the wheel hub. (See for example French Patent No. FR 84 12 509, Ampafrance; U.S. Pat. No. 4,116464, Haley). In other devices the locking member, which acts in the same way, is moved substantially radially (see for example German Patent Application No. DE 2 351 435, Mueller; European Patent Application No. EP 64 368, Kirk-Dyson). These devices are not entirely satisfactory because of the stresses exerted on the components of the braking device or on the wheel spokes or hub, which give rise to the risk of wear or even fracture. Furthermore, the braking obtained does not result in complete immobilization of the wheel, which is still able to turn relative to the locking finger, over an angle corresponding to that existing between two adjacent spokes of the wheel hub.

Other braking devices of a known type act radially on the wheel tire, taking advantage of the flexibility of the latter. (See for example French Patent No. 85 02 374, Ampafrance). Although these devices generally give satisfaction when the wheel is new, it is nevertheless found that the braking efficiency of the device declines as the wheel tire wears.

SUMMARY OF THE INVENTION

The object of the present invention is a braking device which eliminates these disadvantages, the effectiveness of which is independent of wheel tire wear, and which through its very construction can achieve complete and accurate immobilization of the wheel.

In a preferred embodiment the invention also seeks to permit simultaneous action on both wheels on one and the same axle, thus considerably improving braking efficiency.

The wheel braking device, particularly for a baby carriage, according to the invention is suitable for a baby carriage comprising a chassis mounted by means of a connection member of the suspension type and having at least one axle common to a pair of wheels. The braking device comprises a brake member operated by a brake pedal and capable of braking the rotation of at least one of the wheels. According to the invention the brake pedal is mounted to rotate with the axle. The suspension comprises two suspension members, each mounted, near a wheel, about an eccentric fastened to the axle, each suspension member having a brake member. Each wheel is provided with a brake drum fastened to it and is adapted to cooperate by its periphery with the corresponding brake member when the axle is turned in a first direction through action on the brake pedal, thus bringing the brake member towards and in contact with the periphery of the brake drum.

In a preferred embodiment of the invention the two suspension members are mounted in the same way about an eccentric fastened to the axle, and the two wheels are provided with a brake drum, so that the rotation of the axle through the action of the brake pedal has the effect of braking the two wheels simultaneously through the cooperation between the respective brake members of the two suspension members and the peripheries of the brake drums of the two wheels.

The brake pedal is preferably fastened to a release pedal which, when operated, is capable of rotating the axle in a second direction, thus moving the brake member away and freeing the wheel equipped with the brake drum.

As in the previous case, if the two wheels are equipped with brake drums, operation of the release pedal simultaneously releases both wheels.

The brake member may be a simple brake pad which comes into substantially radial contact with the periphery of a brake drum whose surface is substantially smooth. The braking action is then achieved through frictional contact between the brake pad and the periphery of the brake drum.

However, in a preferred embodiment the brake drum has on its periphery a plurality of teeth, which correspond to teeth formed on the surface of the brake member. Effective rotational immobilization of the wheel equipped with a brake drum is thus achieved.

It is advantageous to dispose the brake member in such a manner that it lies substantially under the axle. In this way, action on the chassis, for example for the purpose of passing over a curb or similar obstacle, will tend to move the brake members away from the brake drums, so that there will be no tendency to apply an undesirable braking action.

The device preferably also includes resilient indexing means capable of holding the axle in the respective wheel braking and wheel release positions. In a preferred embodiment these resilient indexing means may consist of a flexible indexing finger fastened to the suspension member and adapted to move in an indexing groove formed in the brake pedal, which is then mounted near one of the wheels. This groove is provided at each end with a recess into which the flexible finger can penetrate when the pedal is turned, in order to immobilize the latter in either the braking position or the release position. Since the brake pedal is fastened to the axle, this entails the immobilization of the entire braking device in one of these positions.

In the preferred embodiment in which a braking device is provided on each of the wheels on the axle, an indexing sleeve provided with an indexing groove having the same recesses at each end is mounted near the other wheel in order to cooperate with a flexible indexing finger fastened to the suspension member of the wheel in question. This indexing finger can then move in the indexing groove in the sleeve by penetrating into the recesses in the indexing groove when the axle is turned by means of the pedal.

In a preferred embodiment of the invention each suspension member comprises a flexible, pliable strip supporting a chassis member near one end and surrounding the eccentric mounted on the axle near its other end. The top end of the flexible strip is adapted to come into contact with a member mounted on the axle in such a manner as to harden the suspension from this contact position onwards. A suspension of particularly simple construction, supplying two different suspension actions is thus obtained.

The integration of the brake member in the suspension member, which itself is for example in the form of a molded plastic part, permits particularly simple and effective construction of the brake device and suspension.

BRIEF DESCRIPTION OF THE DRAWINGS

The invention will be better understood from the detailed description given below of one particular embodiment, which is taken by way of example without constituting a limitation in any way, and which is illustrated in the accompanying drawings, in which.

DESCRIPTION OF THE PREFERRED EMBODIMENTS

Figure 1:
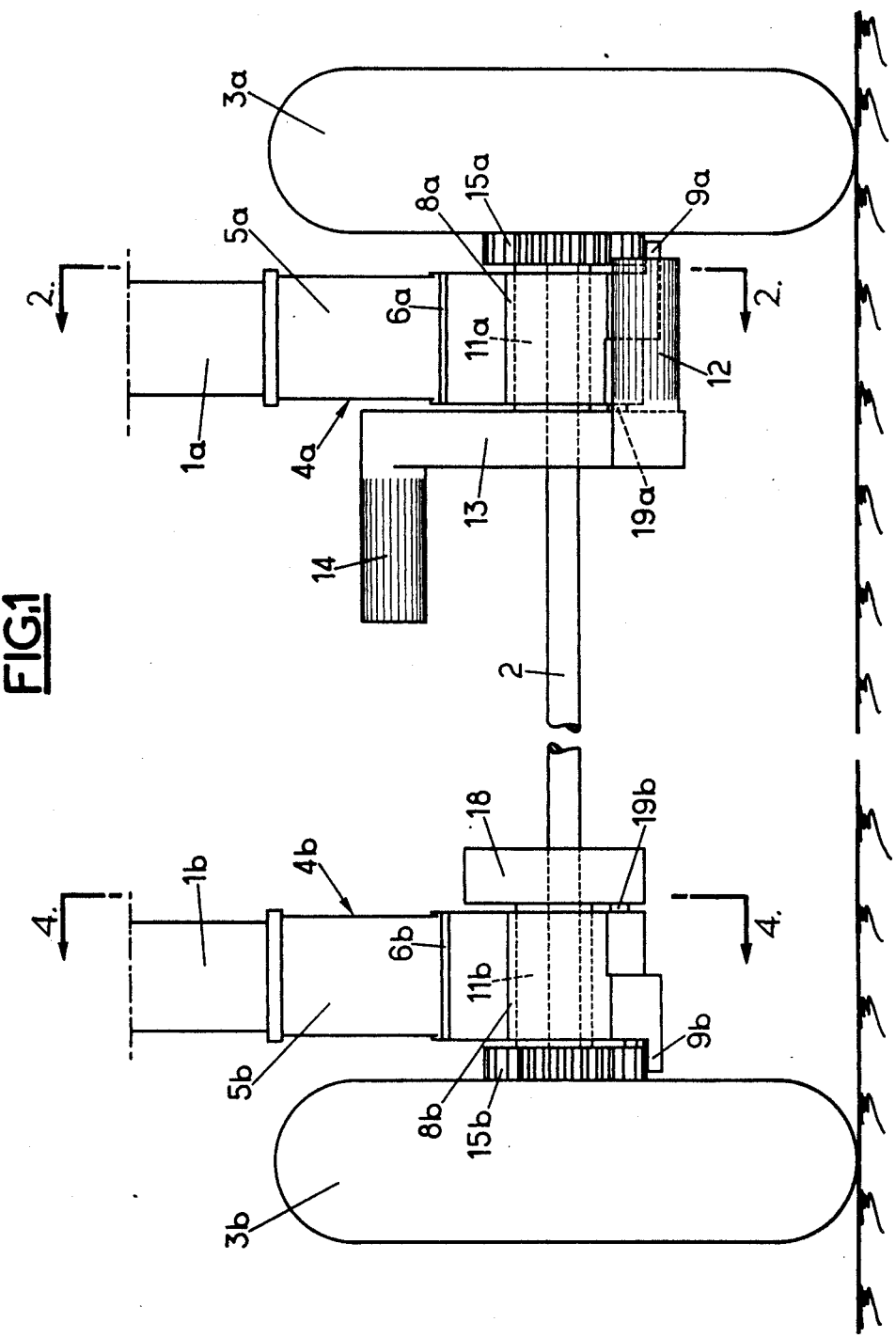
FIG. 1 is a partial schematic elevational view of the rear axle of a baby carriage provided with a braking device according to the invention on both wheels, in the braking position.

As illustrated in the drawings, the braking device of the invention is suitable for a baby carriage, of which the drawings show the bottom end of two chassis members 1a, 1b. The two rear wheels 3a and 3b are mounted for free rotation on the rear axle 2. The connection between the chassis members 1a and 1b and the axle 2 is made with the aid of two suspension members 4a and 4b, which are of identical construction.

In a general way the indices a and b will in the present description, and in the drawings, be assigned to identical components situated on each side of the axle 2 near the respective wheel 3a or 3b. The description will therefore be given with reference to the braking device of one of the wheels, the other braking device being identical, unless otherwise stated. It will in addition be noted that, although in the example illustrated the baby carriage has only one wheel 3a or 3b on each side, it would be perfectly possible to conceive of the application of the braking device of the invention in the same way to a pair of wheel sets each comprising two wheels mounted side by side for rotation at each end of the axle 2.

Figure 2:
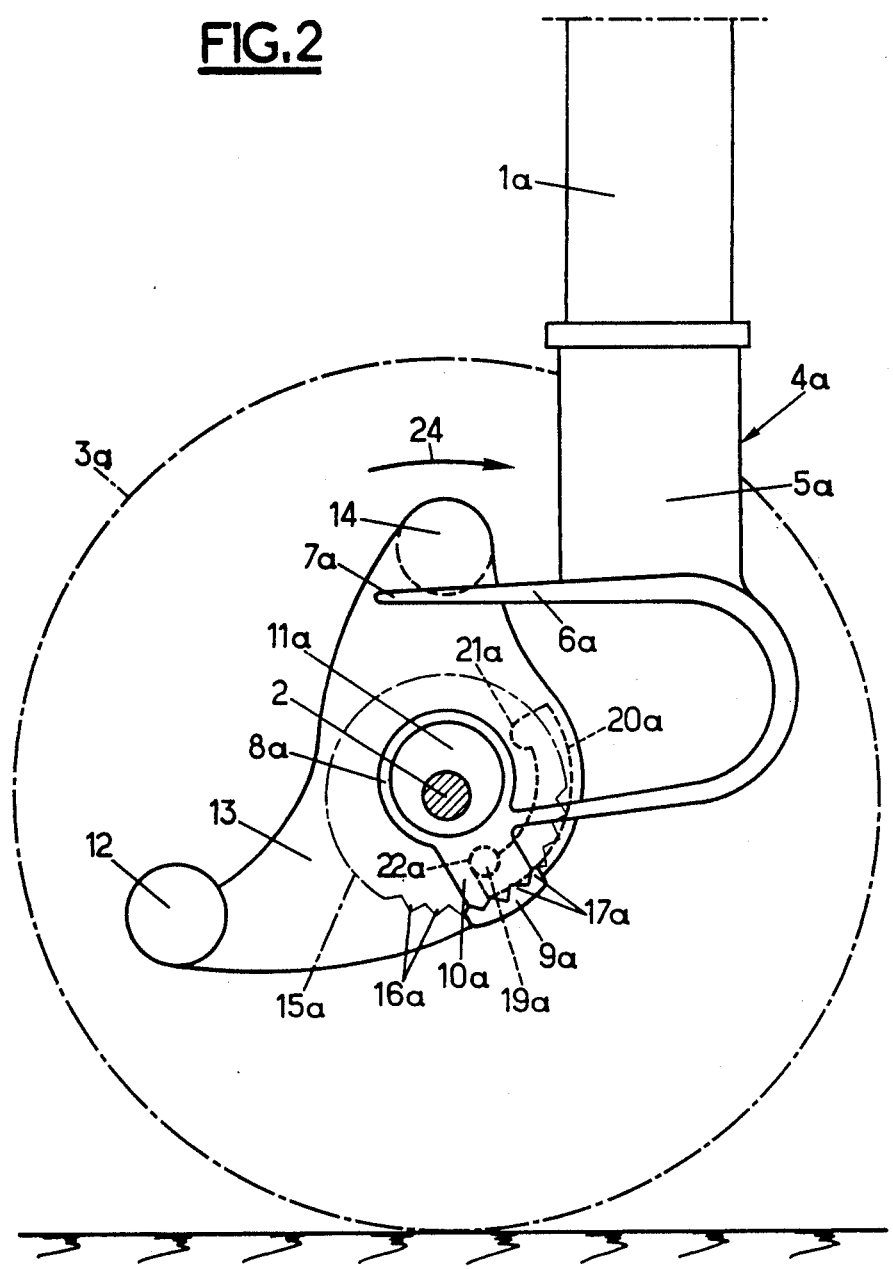
FIG. 2 is a sectional view taken along line II—II in FIG. 1, and thus shows, in side view and in the braking position, the different components of the braking device.
Figure 3:
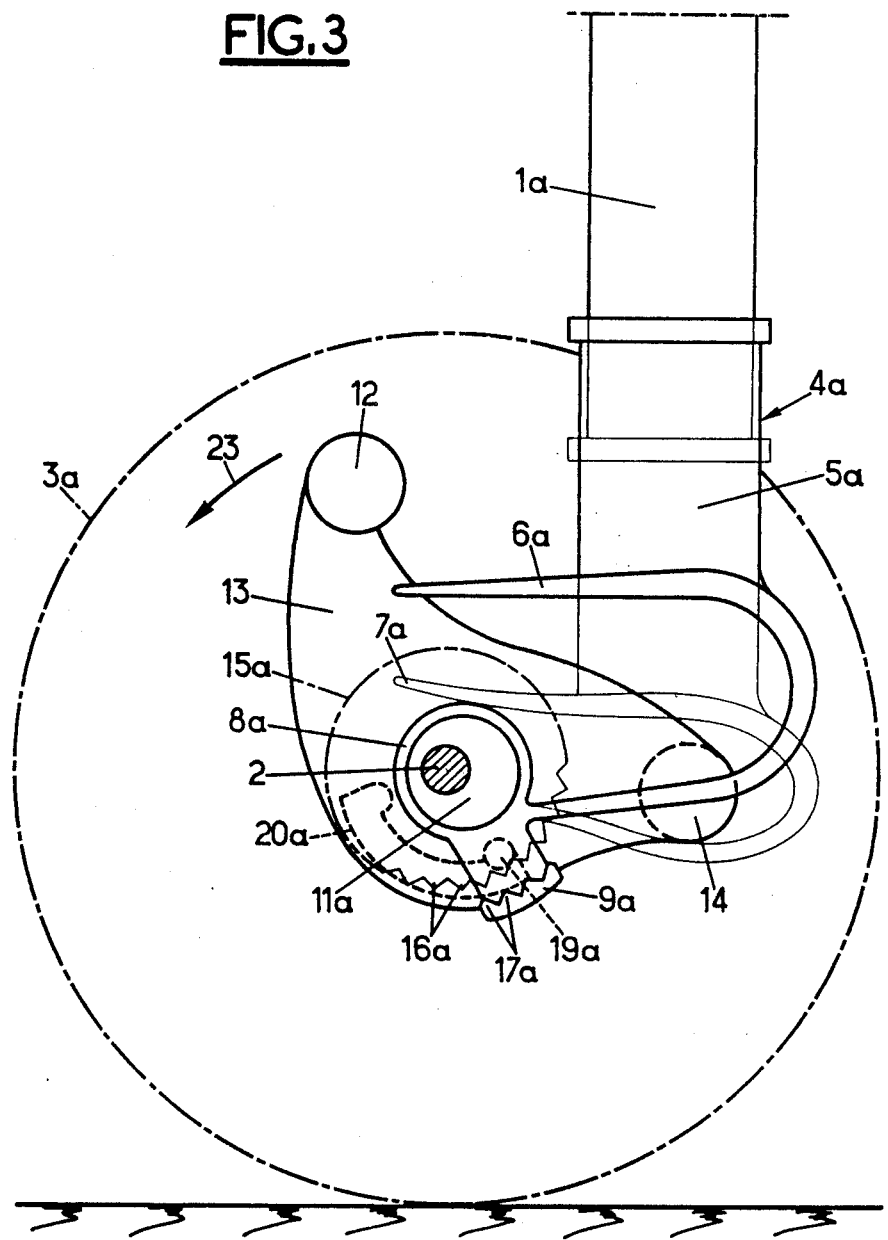
FIG. 3 is a similar view to FIG. 2, but which shows the release position and also the possible movements of the suspension.
Figure 4:
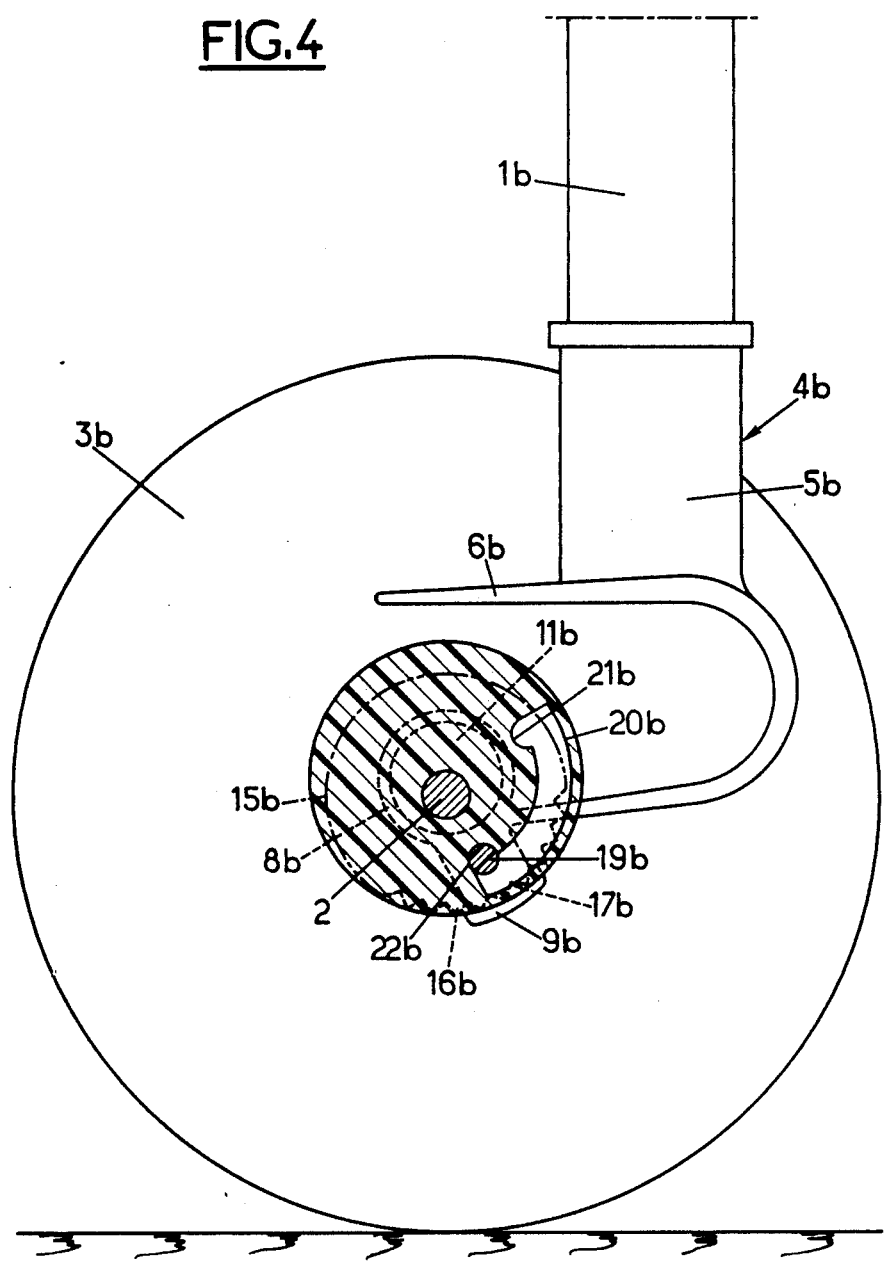
FIG. 4 is a sectional view taken along line IV—IV in FIG. 1 and thus shows, in side view, the different components of the braking device on the other wheel, in the braking position.

As can be seen particularly in FIGS. 2 to 4, the suspension member 4a, which is symmetrical to the suspension member 4b, is provided with a vertical sleeve 5a which receives the end of the chassis member 1a, whose axis is vertical. The sleeve 5a is fastened to a flexible, pliable U-shaped strip 6a, whose top end 7a is free, while at its opposite, bottom end is provided with a cylindrical bush 8a, whose axis is horizontal, as well as a pad-like braking member 9a situated substantially beneath the axis of the bush 8a, at the end of a radial leg 10a, which in the example illustrated is slightly inclined in the direction of the axis of the sleeve 5a.

The bush 8a is mounted for free rotation on an eccentric 11a fixed for rotation with the axle 2.

A brake pedal 12 is fastened to an operating member 13 carrying at its opposite end a release pedal 14. As can best be seen in FIG. 1, in the example illustrated the brake pedal 12 extends parallel to the axle 2 in the direction of the wheel 3a, while the release pedal 14, which likewise extends parallel to the axle 2, is directed towards the opposite wheel 3b. The operating member 13, in the form of a plate, is disposed in the immediate vicinity of the suspension member 4a and is fastened to the eccentric 11a. The operating member 13, provided with the two pedals 12 and 14, and the eccentric 11a can advantageously be made in the form of an a molded plastic part moulding, which can be fastened to the axle 2 by a force fit, adhesive bonding or any other equivalent means.

Each wheel 3a, 3b is provided with a brake drum 15a, 15b which has a generally cylindrical shape and is concentric to the corresponding wheel 3a, 3b and therefore to the axle 2. The periphery of each brake drum 15a, 15b is provided with a plurality of axial teeth 16a visible in FIGS. 2 to 4. These teeth 16a, 16b have the same profile as teeth 17a, 17b provided on the inside surface of the brake member 9a, 9b fastened to each suspension member 4a, 4b.

On the side where the wheel 3b and the suspension member 4b not provided with an operating member 13 equipped with the two pedals 12 and 14 are disposed, the eccentric 11b is fastened to an indexing sleeve 18 fixed for rotation with the axle 2.

Each suspension member 4a, 4b has a flexible indexing finger 19a, 19b whose axis is parallel to the axle 2 and which is disposed on the corresponding suspension member 4a, 4b oppositely to the brake member 9a, 9b, which also projects axially outwards parallel to the axis of the axle 2, in such a manner as to cooperate with the corresponding brake drum 15a, 15b, as can be seen in. FIG. 1.

Each flexible indexing finger 19a, 19b cooperates with an indexing groove 20a, 20b which is formed in the facing surfaces of the operating member 13 and of the indexing sleeve 18 respectively. Each incurved indexing groove 20a, 20b is centered at the geometrical center of the corresponding eccentric 11a, 11b, or, which amounts to the same thing, at the center of the bush 8a, 8b of the suspension member 4a, 4b. Each indexing groove 20a, 20b has at each end a recess 21a, 21b and 22a, 22b, these recesses being, in the example illustrated, directed radially inwards in such a manner that they can receive the indexing fingers 19a, 19b in order to define the respective braking and release positions.

A description will now be given, with reference to the drawings, of the braking device of the invention, taking as a starting point the release position shown in FIG. 3, where the brake pedal 12 is in the higher position, while the release pedal 14 is in the lower position. As can be seen in FIG. 3, in this position the eccentric 11a produces a considerable space between the brake member 9a and the axle 2. The teeth 17a of the brake member 9a are therefore spaced a certain distance from the teeth 16a of the periphery of the brake drum 15a, which is concentric to the axle 2 because it is fastened to the wheel 3a. The operating member 13 is held in that release position for the reason that the flexible indexing finger 19a is received in the end recess 21a in the incurved indexing groove 20a. It will be noted that because the brake member 9a is positioned substantially under the axle 2, any crushing action on the baby carriage chassis will tend to move the brake member 9a away from the periphery of the brake drum 15a, thus making it possible to avoid all risk of inopportune braking when passing over an obstacle.

It will be noted that in this position the brake member 9b fastened to the suspension member 4b is also released from the brake drum 15b and is held in that position by means of the indexing finger 19b, which is in the corresponding recess 21b in the indexing groove 20b in the indexing sleeve 18. In this released position the baby carriage can thus be moved since the wheels 3a, 3b turn freely on the ground about the axle 2, which remains stationary.

In order to pass from this free position to the braking position, the pedal 12 is operated, preferably by the foot, to turn the operating member 13 in the direction of the arrow 23 in FIG. 3. At the beginning of this movement a slight resistance, due to the engagement of the indexing fingers 19a, 19b in the respective recesses 21a, 21b, must be overcome. Further pressure on the brake pedal 12 turns the operating member 13, which rotates the axle 2 and consequently the two eccentrics 11a, 11b, which are fixed for rotation with the axle 2. During this rotary movement the two flexible indexing fingers 19a, 19b undergo slight resilient plexing and rub along the inner edge of the indexing grooves 20a, 20b formed respectively in the operating member 13 and in the indexing sleeve 18, these grooves turning simultaneously with the member 13 and the sleeve 18.

The end of the rotary movement is illustrated in FIG. 2, which shows the braking position. Before this position is reached, the two eccentrics 11a and 11b have undergone a rotation of about 90°, which has brought about a displacement in the upward direction and towards the left, referring to FIG. 2, of the brake members 9a, 9b, which are driven by their respective suspension members 4a, 4b. It will be noted that this displacement is of slight amplitude, so that it is not felt on the baby carriage chassis itself. This movement has enabled the brake member 9a, 9b to be displaced so that the teeth 17a, 17b come into contact and mesh with the teeth 16a, 16b provided on the two brake drums 15a, 15b. In the braking position illustrated in FIG. 2 it can in fact be seen that the distance between the brake member 9a and the axle 2 is practically minimal, taking into account the position of the eccentric 11a. This results in the meshing, which has just been mentioned, between the brake member 9a and the brake drum 15a centered on the axle 2, thus bringing about locking of the wheel 3a. Since this operation results from the turning of the axle 2, it will be understood that the same effect is obtained for the wheel 3b through the cooperation between the brake member 9b and the brake drum 15b. In the braking position shown in FIG. 2 the indexing finger 19a has resiliently snapped into the second recess 22a in the incurved indexing groove 20a.

It will be understood that in order to free the wheels from the position shown in FIG. 2 it is only necessary to operate, once again preferably by foot, the release pedal 14, which is in an accessible position, as can be seen in FIG. 2, by pushing this pedal in the direction of the arrow 24 in FIG. 2, until the position in FIG. 3 is reached. It will be noted that in the braking position shown in FIG. 2 the brake pedal 12 is situated slightly below the level of the axle 2, while the release pedal 14 is practically vertically in line with and above the axle 2. In the release position shown in FIG. 3 the release pedal 14 is practically at the same horizontal level as the axle 2, in front of the latter, and the brake pedal 12 is substantially above the the axle 2. Selection of these different positions makes it possible to facilitate control of the operating member 13 by foot.

In summary, through the simple action of rotating the axle, the invention makes it possible for the braking on one of the wheels, or preferably both wheels, of the baby carriage to be directly controlled.

The operation of the suspension member 4a is illustrated schematically in fine lines in FIG. 3. When the chassis exerts a downward pushing action on the suspension member 4a, the thin U-shaped strip 6a is deformed to generate an antagonistic force, which defines the hardness of the suspension. When the free end 7a of the strip 6a comes into contact with the bush 8a, as illustrated in fine lines in FIG. 3, the deformation of the flexible strip 6a continues through an end portion of smaller dimensions, thus increasing the hardness of the suspension in this second deformation phase. It will be noted that the axis of the sleeve 5a remains practically vertical.

Although the description given above is based on a baby carriage, it will of course be understood that the invention could easily be applied to the braking of any wheel, that is to say a wheel of a shopping trolley, an invalid chair, or any other wheel mounted structure.

Moreover, although the chassis of the baby carriage described is mountd on the axle by means of a suspension, it will be understood that the chassis could also be mounted directly on the axle by means of the eccentric described.

Obviously, numerous modifications and variations of the present invention are possible in light of the above teachings. It is therefore to be understood that within the scope of the appended claims, the invention may be practiced otherwise than as specifically described herein.

I claim:

1. A wheel braking device, particularly for a baby carriage, comprising:
   a chassis mounted by means of a connection member of the suspension type, or directly on at least one axle common to a pair of wheels and
   a brake member operated by a brake pedal and adapted for braking the rotation of at least one wheel, wherein the brake pedal is mounted to rotate with the axle wherein the suspension comprises
   two suspension members of which at least one is mounted near a wheel about an eccentric fastened to the axle each suspension member having a brake member; wherein at least one wheel is provided with a brake drum fastened thereto and adapted to cooperate on its periphery with a corresponding brake member when the axle is turned in a first direction through action on the brake pedal, thus bring the brake member towards and in contact with the periphery of the brake drum.

2. A wheel braking device according to claim 1, wherein the two suspension members each have a brake member, each wheel includes a brake drum, and each suspension member is mounted about an eccentric fastened to the axle, in such a manner that rotation of the axle through the action of the brake pedal brings about the simultaneous braking of both wheels.

3. A wheel braking device according to claim 1 or 2, wherein the brake pedal is fastened to a release pedal which, when operated, is adapted to rotate the axle in a second direction, thus moving the brake member away and freeing the wheel equipped with the brake drum.

4. A wheel braking device according to claim 1, wherein the brake member comprises a brake pad which comes into substantially radial contact with the periphery of the brake drum.

5. A braking device according to claim 1 wherein the periphery of the brake drum has a plurality of teeth which correspond to teeth formed on the surface of the brake member.

6. A braking device according to claim 1 wherein the brake member is mounted in such a manner as to be positioned substantially under the axle.

7. A braking device according to claim 1 which comprises indexing means for holding the braking device in a respective braking and release position.

8. A braking device according to claim 7, wherein
the brake pedal is fastened to an operating member mounted near one of the wheels and is provided with an indexing groove having recesses at each end thereof, and
a flexible indexing finger fastened to the suspension member and which penetrates into the indexing groove when the latter is turned and is adapted to be received resiliently in the recesses upon turing of the operating member.

9. A braking device according to claim 7 or 8, which comprises
an indexing sleeve having an indexing groove provided with recesses at each end thereof, the indexing sleeve being mounted near one of said wheels in such a manner as to cooperate with a flexible indexing finger fastened to the suspension member and adapted to penetrate into the indexing groove and to be received in the recesses through rotation of the axle.

10. A braking device according to claim 1 wherein each suspension member comprises a flexible curved strip supporting said chassis near one end and surrounding the eccentric near its other end.

11. A braking device according to claim 10, wherein the top end of the strip is adapted to come into contact with a member mounted on the axle in order to harden the suspension form that position.

* * * * *